(12) United States Patent
McCartney

(10) Patent No.: US 7,104,204 B2
(45) Date of Patent: Sep. 12, 2006

(54) AUTOMATIC PNEUMATIC SEAL BETWEEN FRAME MEMBERS

(75) Inventor: Scott Charles McCartney, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/634,265

(22) Filed: Aug. 5, 2003

(65) Prior Publication Data

US 2005/0028713 A1 Feb. 10, 2005

(51) Int. Cl.
*A01C 5/00* (2006.01)
*A01C 7/18* (2006.01)

(52) U.S. Cl. .......................... 111/53; 111/60; 111/167; 111/193

(58) Field of Classification Search ............ 111/52–62, 111/144, 157, 163–170, 174–179, 183–186, 111/190–196, 200; 172/311, 452, 454–456, 172/662, 613, 681, 734, 749, 756, 753, 776
See application file for complete search history.

(56) References Cited

U.S. PATENT DOCUMENTS 1,336,323 A 4/1920 Stout
4,843,983 A 7/1989 Olson .................... 111/174
5,515,795 A 5/1996 Ledermann et al.

FOREIGN PATENT DOCUMENTS

DE 20 25 039 12/1971
DE 32 27 487 4/1983

*Primary Examiner*—Christopher J. Novosad

(57) ABSTRACT

A seeding machine is provided with a frame comprising a center frame section and left and right wing frame sections. The frame has a planting configuration and a transport configuration. The center frame section and the left and right wing frame sections each have a hollow toolbar forming a pneumatic manifold. Individual planting units are mounted to the toolbars. The pneumatic manifold of the center frame section is automatically pneumatically coupled to each of the left and right wing frame sections by a resilient bell that forms a pneumatic path between the center frame section and the left and right wing frame sections when the frame is in its planting configuration. The pneumatic manifolds are pneumatically coupled to pneumatic seed meters on the planting units by air hoses.

8 Claims, 3 Drawing Sheets

AUTOMATIC PNEUMATIC SEAL BETWEEN FRAME MEMBERS

FIELD OF THE INVENTION

The present invention is directed to a pneumatic seal between toolbar frame members that automatically pneumatically couples one frame member to another when the toolbar is extended into its planting position.

BACKGROUND OF THE INVENTION

Agricultural seeding machines use air pressure to meter and transport seed and agricultural chemicals. Pneumatic seed meters on row crop planters fall into two basic systems. In one system positive air pressure, that is air pressure which is greater than ambient air pressure, is used to meter the seeds. In the other system negative air pressure, that is air pressure that is less than ambient air pressure, is used to meter the seeds. An air pump is used to create the positive or negative air pressure. The air pump may be pneumatically coupled to an air pressure manifold. The air pressure manifold in turn is pneumatically coupled to the individual seed meters by an air hose. It is known to seal a transverse support beam or toolbar to form the air pressure manifold.

U.S. Pat. No. 4,843,983 discloses a quick pneumatic coupling for use in a folding agricultural planter comprising a rigid plastic funnel mounted to the end of a first conduit and a flexible and resilient rubber flange member mounted to a second conduit. The inner surface of the funnel forms a sealing surface which is contacted by the flange when it is inserted into the funnel. The coupling can be automatically coupled and decoupled by pivotally inserting and withdrawing the flanged member into and out of the receiving funnel

SUMMARY OF THE INVENTION

It is an object of the present invention to provide a simple automatic assembly for pneumatically coupling pneumatic toolbar manifolds when a toolbar is extended into its planting configuration.

It is a feature of the present invention that the assembly is a resilient rubber bell forming a pneumatic path between pneumatic manifolds.

A seeding machine is provided with a frame comprises a center frame section and left and right wing frame sections. The frame has a planting configuration and a transport configuration. The center frame section and the left and right wing frame sections each comprise a truss toolbar formed from a transversely extending main toolbar and a vertically displaced parallel secondary bar. The secondary toolbar is hollow and sealed to form a pneumatic manifold. Individual planting units are mounted to the toolbars. The pneumatic manifold of the center frame section is pneumatically coupled to each of the left and right wing frame sections by a resilient bell that forms a pneumatic path between the center frame section and the left and right wing frame sections when the frame is in its planting configuration. The pneumatic manifolds are pneumatically coupled to pneumatic seed meters on the planting units by air hoses.

DETAILED DESCRIPTION

Figure 1:
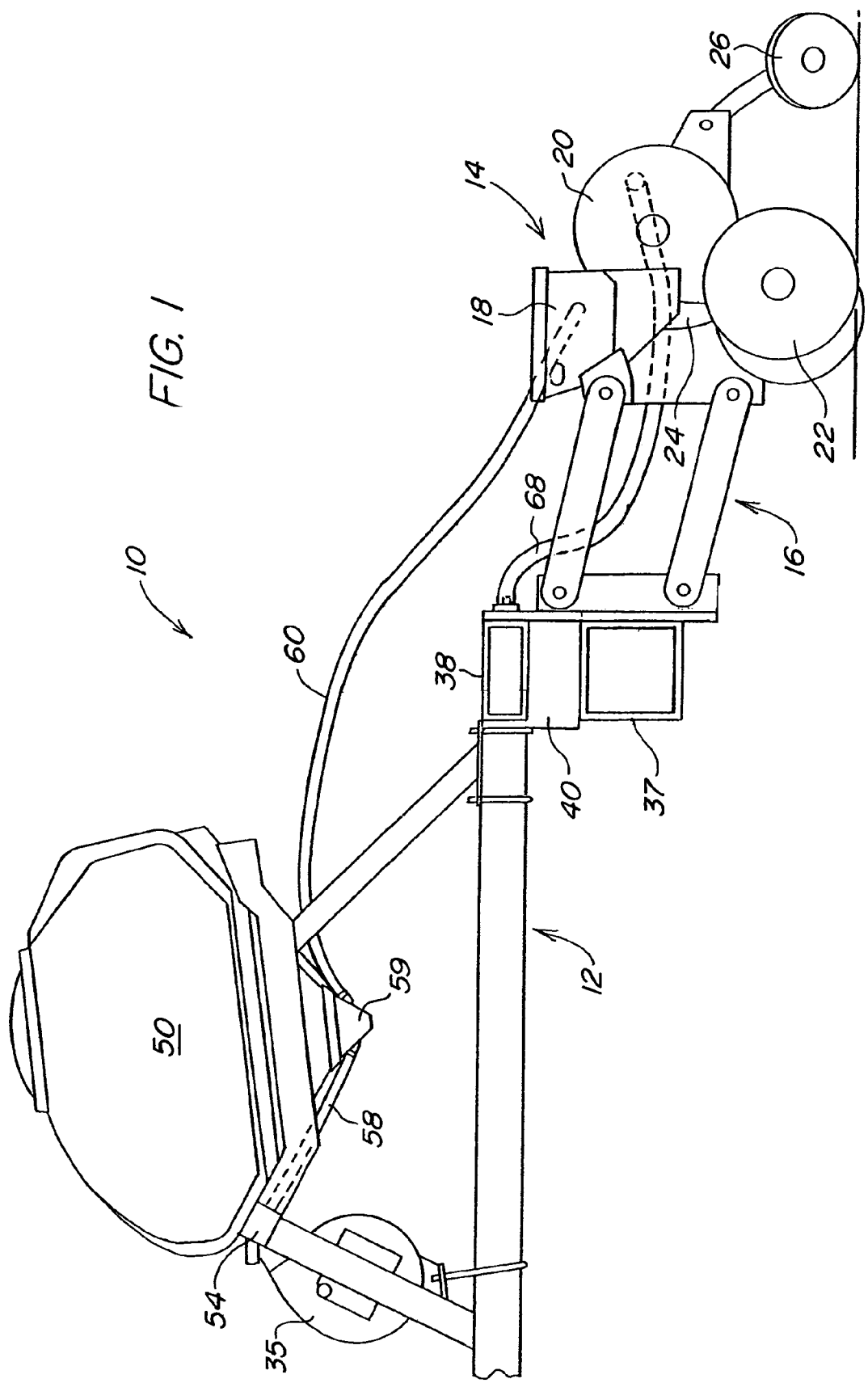
FIG. 1 is a side schematic view of the pneumatic seed delivery system.
Figure 2:
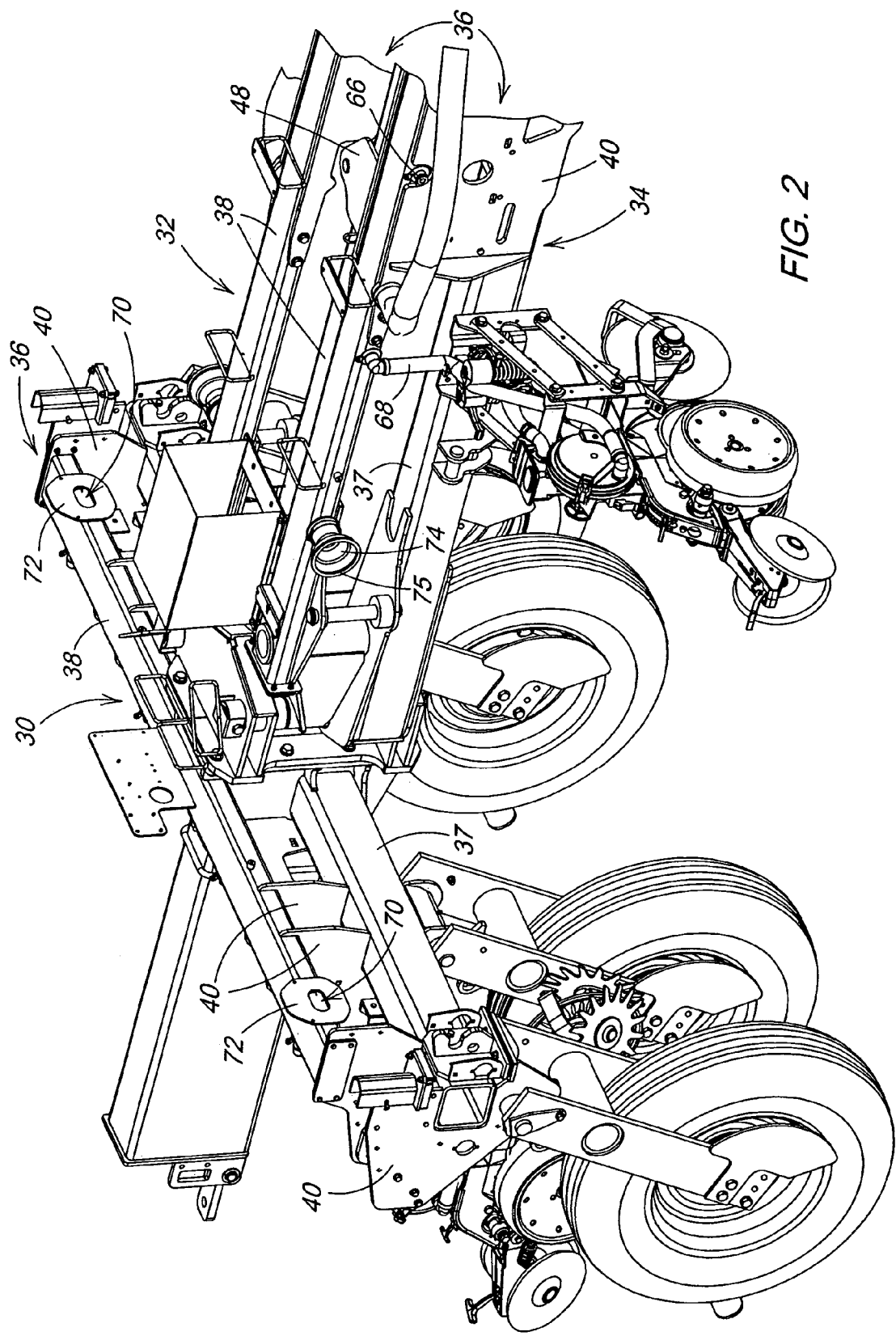
FIG. 2 is a partial perspective view of a seeding machine in its transport position.
Figure 3:
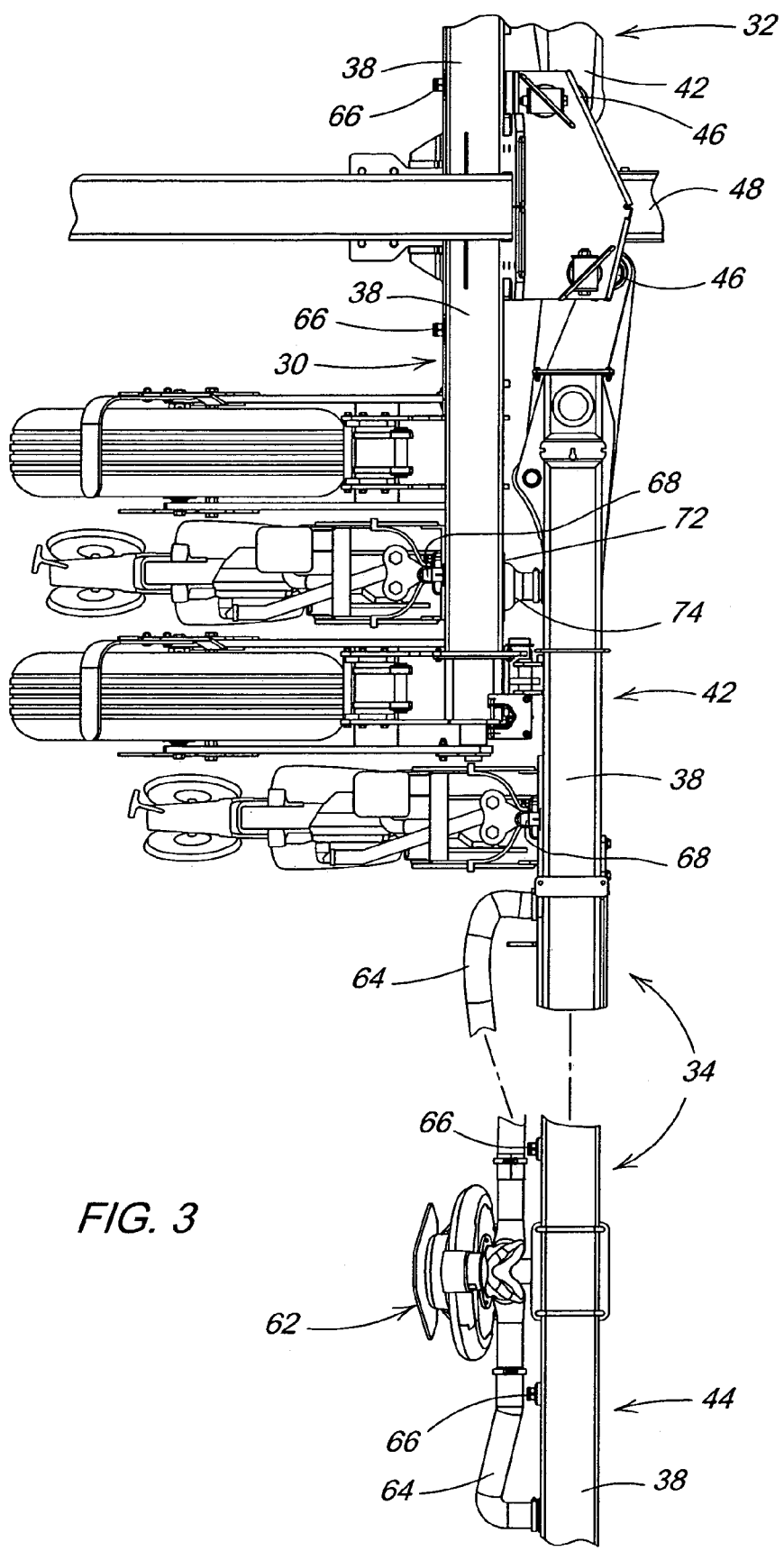
FIG. 3 is a partial top view of a seeding machine in its planting position.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the illustrated embodiment the seed meter 20 is a vacuum seed meter, although positive air pressure could also be used with the subject invention.

The frame 12 is provided with a center frame section 30 and left and right wing frame sections 32 and 34. Each frame section comprises a transversely extending toolbar 36 comprising a main toolbar 37 and a parallel secondary bar 38 that are vertically displaced form one another and joined together by webs 40 to form a truss. Both wing frame sections 32 and 34 are provided with an inner wing section 42 and an outer wing section 44. The inner and outer wing sections 42 and 44 are pivotally coupled to one another by fore/aft extending pivots so that the frame 12 can better follow the contours of the ground. The inner wing frame segments 42 do not pivot along fore/aft extending axis relative to the center frame section 30. In its transport configuration the wing frame segments 32 and 34 of the frame 12 are forwardly folded about vertical pivots 46 so that they are parallel to the fore/aft extending telescoping draw bar 48.

Seed is stored in a main hopper 50 mounted on the center frame section 30. An air pump 35 is used to pneumatically transfer seed from the main seed hopper 50 to the auxiliary seed hopper 18. The air pump 52 is driven by a hydraulic motor, however other motor arrangements could be used, like electric motors for driving the air pump 52. The air pump 52 directs pressurized air to a manifold 54 through main air hose 56. The manifold 54 is formed from a hollow closed tubular support of the frame 12. The manifold 54 is provided with a plurality of manifold outlets corresponding to the number of planting units 14 mounted to the frame 12. Individual air supply lines 58 extend from the manifold outlets and direct pressurized air from the manifold 54 to the upstream side of the nozzle assembly 59. The nozzle assembly 59 is located at the bottom of the main hopper 50. Product located in the main hopper 50 flows by gravity to the nozzle assembly 59. The upstream side of the nozzle assembly 59 is provided with a number of air inlets corresponding to the number of air supply hoses 58. The air inlets are spaced transversely along the upstream side of the nozzle assembly 59. The downstream side of the nozzle assembly 59 is provided with a number of product outlets corresponding to the number of air supply hoses 58. The product outlets are also spaced transversely along the downstream side of the nozzle assembly 59. The product outlets lie opposite from the air inlets. Each air inlet is aligned with a respective product outlet. Product supply hoses 60 extend from the product outlets to the individual auxiliary hoppers 18 for directing product entrained in the air stream to the auxiliary hoppers 18.

The seed in the auxiliary hoppers 18 is metered by a vacuum seed meter 20. The vacuum is formed by left and right vacuum pumps 62 mounted on the wing frame segments 32 and 34, only the right one being shown. The vacuum pumps 62 are driven by hydraulic motors, however other motor arrangements could be used, like electric motors. The vacuum formed by the pumps 62 is communicated to the sealed secondary bars 38 of the inner and outer wing frame segments 42 and 44 by hoses 64. The hollow secondary bars 38 form a vacuum manifold for distributing vacuum along the respective toolbar. Each secondary bar 38 is provided with a series of transversely spaced nipples 66. A nipple 66 corresponding to each planting unit 14. Air hoses 68 extend from the nipples 66 to the individual seed meters 20.

The secondary bar 38 of the center frame section 30 is provided with left and right openings 70 that are surrounded by a flat plate 72. The secondary bars 38 of the inner wing section 42 are provided with a rubber bell 74 having a circular rim 75. The rubber bell 74 lies opposite the openings 70 when the frame 12 is in its planting position. The bells 74 are sized to engage the flat plates 72 when the frame 12 is in its planting position. The rims 75 surround the openings 70 and forming a seal with the flat plate 72. It is important to control the distance between the secondary bar 38 on the center frame 30 and the secondary bars 38 on the wing frames 32 and 34, so that, first the bells 74 engage the plates 72, and second the bells 74 are not overly compressed by the secondary bars 38 permanently deforming the bell 74.

Having described the illustrated embodiment, it will become apparent that various modifications can be made without departing from the scope of the invention as defined in the accompanying claims.

The invention claimed is:

1. A seeding machine comprising:
    a frame having a center frame section having opposite ends and left and right wing frame sections forwardly offset from the center frame section, the frame having a planting configuration wherein the left and right wing frame sections extend transversely and parallel from the center frame section and a transport configuration wherein the left and right wing frame sections extend perpendicular to the center frame section;
    the center frame section and the left and right wing frame sections each have a hollow toolbar forming a pneumatic manifold, wherein each toolbar comprises a main toolbar and a vertically displaced parallel secondary bar, the secondary bar forming with the main toolbar a truss wherein pneumatic manifolds are formed in the secondary bars;
    individual planting units are mounted to the toolbars, each planting unit comprises a pneumatic seed meter and a furrow opener;
    wherein the pneumatic manifold of the center frame section is pneumatically coupled to each of the left and right wing frame sections by a resilient bell that forms a closed pneumatic path between the center frame section and the left and right wing frame sections at locations offset inwardly from ends of the center frame when the frame is in the planting configuration, and wherein the pneumatic manifolds are pneumatically coupled to the pneumatic seed meters.

2. The seeding machine as defined by claim 1 further comprising a forwardly extending draw bar extending from the center frame section.

3. The seeding machine as defined by claim 2 wherein the left and right wing frame sections are folded forwardly from their planting configuration to their transport configuration along side the draw bar.

4. The seeding machine as defined by claim 1 wherein the secondary bars are provided with a series of nipples corresponding to the individual planting units and the air hoses are coupled to the nipples.

5. The seeding machine as defined by claim 4 wherein the resilient bell has a circular rim.

6. The seeding machine as defined by claim 5 wherein the toolbar of the center frame section is provided with left and right openings and the toolbars of the left and right wing frame sections are provided with the resilient bells.

7. The seeding machine as defined by claim 6 wherein the openings of the toolbar of the center frame section are provided with flat plates which engage the circular rims of the resilient bells when the frame is in its planting configuration.

8. The seeding machine as defined by claim 7 further comprising vacuum pumps that are mounted to the wing frame sections and pneumatically coupled to the toolbars of the wing frame sections.

* * * * *